US012319024B2

(12) United States Patent
Holderman et al.

(10) Patent No.: US 12,319,024 B2
(45) Date of Patent: Jun. 3, 2025

(54) PACKAGING APPARATUS, SYSTEM, AND METHOD FOR FORMING FILLED CONES

(71) Applicant: MPI, LLC, Las Vegas, NV (US)

(72) Inventors: Mark W. Holderman, Spokane, WA (US); Gregory A. Russell, Spokane, WA (US)

( * ) Notice: Subject to any disclaimer, the term of this patent is extended or adjusted under 35 U.S.C. 154(b) by 0 days.

(21) Appl. No.: 18/471,391

(22) Filed: Sep. 21, 2023

(65) Prior Publication Data

US 2024/0009951 A1 Jan. 11, 2024

Related U.S. Application Data

(63) Continuation of application No. 17/113,429, filed on Dec. 7, 2020, now Pat. No. 11,794,438.

(51) Int. Cl.

*B31B 50/28* (2017.01)
*B31B 50/12* (2017.01)
*B31B 50/585* (2017.01)
*B31B 110/10* (2017.01)

(52) U.S. Cl.

CPC .............. *B31B 50/28* (2017.08); *B31B 50/12* (2017.08); *B31B 50/585* (2017.08); *B31B 2110/10* (2017.08)

(58) Field of Classification Search

CPC ....... B31B 50/28; B31B 50/12; B31B 50/585; B31B 2110/10; B31B 50/262; A24C 5/02; B65B 7/02; B65B 7/06; B65B 7/14; B65B 7/16; B65B 7/28; B65B 31/02; B65B 43/00; B65B 43/42; B65B 51/00; B65B 51/10

See application file for complete search history.

(56) References Cited

U.S. PATENT DOCUMENTS 2,760,701 A * 8/1956 Phelps ................. A23G 3/0252 53/385.1
3,040,935 A 6/1962 Lopata
4,252,052 A * 2/1981 Meyers ................... B31B 50/00 493/134
4,526,527 A * 7/1985 Koll ...................... B31F 1/0087 184/6.26
4,572,216 A * 2/1986 Josuttis .................... A24C 5/42 131/70
4,608,809 A * 9/1986 Francis ................. B65B 7/2892 53/330
4,729,206 A * 3/1988 Francis ................... B65B 39/12 53/297
5,154,040 A * 10/1992 Dureuil ................. B65B 31/043 53/511
5,286,247 A * 2/1994 Weder ....................... B44C 3/04 493/171

(Continued)

*Primary Examiner* — Gloria R Weeks
*Assistant Examiner* — Mobeen Ahmed
(74) *Attorney, Agent, or Firm* — Aronberg Goldgehn Davis and Garmisa

(57) ABSTRACT

The technology described herein generally relates to an automated packaging apparatus, system and method that packages loose particles into a conical container as well as the final folded packages. More specifically, loose plant matter, such as crumbled dried leaves, are supplied to successive paper cones. The apparatus uses a packing method to accurately fill the cones, pack the crumbled leaves into the cones, and close the wide top portion of the cone into a precise shape.

12 Claims, 14 Drawing Sheets

(56) References Cited

U.S. PATENT DOCUMENTS 5,867,966 A * 2/1999 Mogard ................ B65D 5/746 53/563
6,027,440 A * 2/2000 Roth ...................... B65H 5/228 493/436
6,213,926 B1 * 4/2001 Weder ..................... B31B 70/00 425/388
6,474,368 B2 11/2002 Clusserath
9,179,706 B2 11/2015 Jespersen
9,295,284 B2 * 3/2016 Prestia ................ A24D 3/0216
10,231,470 B2 3/2019 Inoue
10,648,995 B2 5/2020 Accurso
11,178,900 B2 * 11/2021 Giddings .............. G06F 3/0484
11,382,352 B2 * 7/2022 Yamay ..................... A24C 5/54
2005/0091943 A1 * 5/2005 Blake .................... B65B 51/043 53/512
2009/0288371 A1 * 11/2009 Squarzoni ............ B65B 19/228 53/574
2011/0177930 A1 * 7/2011 Criblez ................. B31B 50/262 493/416
2015/0352780 A1 * 12/2015 Messerschmid ........ B31B 50/00 156/189
2016/0114913 A1 * 4/2016 Eto ........................ B65B 3/025 229/5.8
2016/0185065 A1 * 6/2016 Sytema .................. B65B 5/024 493/183
2017/0119043 A1 * 5/2017 Swanson .................. A24C 5/42
2017/0188623 A1 7/2017 Cranford
2019/0060920 A1 * 2/2019 Currie ..................... B05B 1/185
2019/0315503 A1 * 10/2019 Jensen ................. B65H 29/006
2019/0328033 A1 * 10/2019 Holderman ........... B31B 50/006
2019/0329514 A1 * 10/2019 Holderman ............. B31B 50/36
2020/0108018 A1 * 4/2020 Shadurin .............. A61K 9/2095
2020/0399006 A1 * 12/2020 Cottone .................. B65B 51/00
2021/0022388 A1 * 1/2021 Sullivan ................... A24C 5/60
2021/0024232 A1 * 1/2021 Giddings .............. G06F 3/0484
2021/0024233 A1 * 1/2021 Giddings ................ B65B 49/08
2022/0110359 A1 * 4/2022 Giddings ............... A24C 5/002

* cited by examiner

FIG 4A
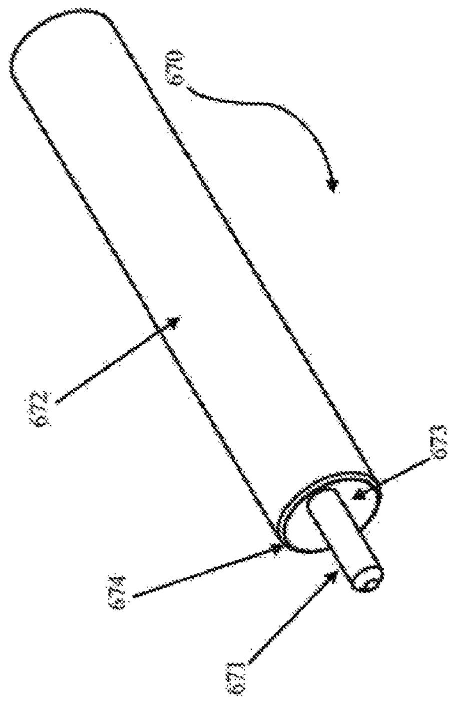
FIG 4C
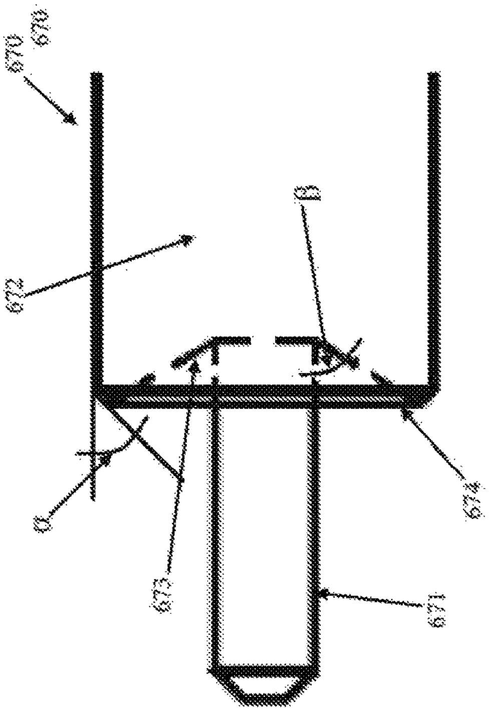
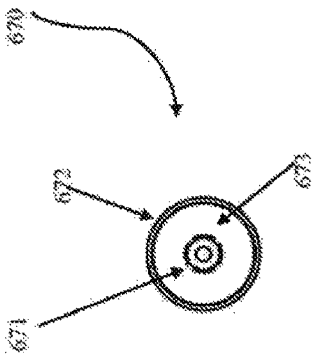
FIG 4B

PACKAGING APPARATUS, SYSTEM, AND METHOD FOR FORMING FILLED CONES

INCORPORATION BY REFERENCE

This application claims priority to and incorporates by reference in its entirety and for all purposes U.S. patent application Ser. No. 17/113,429 filed on behalf of Mark W. Holderman and Gregory August Russell on Dec. 7, 2020.

This application incorporates by reference in its entirety and for all purposes PCT patent application serial number PCT/US19/26711 filed on behalf of Mark W. Holderman and Gregory August Russell in the United States Patent Office on Apr. 10, 2019.

BACKGROUND

Prior to the development of the present apparatus and system, paper cones were filled by hand. People would individually stuff product, such as leaves, into a single cone, and mechanically tamp down the leaves. Alternately, numerous cones could be placed in what is essentially a honeycomb structure with holes that accommodate the cones. Crumbled leaves were then scattered over the holes containing the cones and vibrations or mechanical tamping were used to pack the leaves into the cones.

Each of the foregoing resulted in inaccurate and non-uniformly filled cones. The mechanical tamping often left the leaves too compacted. Sometimes the leaves at the bottom of the cone would be packed too much, while the leaves toward the top of the cone would remain too loose. The mechanical pressure had a tendency to rip the paper cones. Simply relying on vibrations to fill the cones would often result in leaves that were too loose.

These problems were often compounded by the type of plant matter used. Specifically, for plant matter containing a relatively high oil content, the crumbled leaves tended to exhibit a sticky quality that resulted in clumping of the leaves together. The clumped leaves negatively affected the utility of the vibration method because the vibrations alone were not sufficient to break up the clumps. Similarly, the tamping method simply resulted in clumps that were more tightly packed together, exacerbating the problem. In both cases, the clumps tended to lodge in the narrow part of the cone creating air gaps or otherwise non-uniform packing of the plant material within the cone.

Non-uniform packing creates a number of problems. For example, it can affect the weight of the final product. When clumps get packed in with more loose plant matter, the density of the clumps can result in more than the desired amount of plant matter being packed into the cone. The clumps tend to burn at a different rate, disrupting the natural and correct burn rate of a correctly and uniformly packed cone. When clumps create air-gaps, the burn rate of the plant matter can be negatively affected because the lack of solid contact among the plant matter can result in an extinguishing of the plant matter. The density of the clumps can disrupt the flow of air through the plant matter, and act like a blockage in a straw.

Filling cones by hand, or with the honeycomb type packing device also necessitates closing each of the cones by hand. Using those methods, a person was required to manually manipulate each cone and fold the open end to seal in the plant material and prevent it from falling out. Often the cones would simply be closed by twisting the paper on top of the cone together to completely close and seal the top of the cone. That manual process is taxing on a person's hands and limits the number of cones that can be filled in a given amount of time. It also tends to result in non-uniform folds/twisted closures as people tend to have different techniques for folding/twisting and dexterity becomes more limited as hands and fingers become more fatigued.

Further issues have been discovered when utilizing an automated system for filing cones. Automating the filling of cones requires more manipulation of the product, such as leaves, used to fill the cones. The product must be transported through the automated system, for example through a series of hoppers and conveyors. In doing so, the friction between the machine parts and the product (and simply among the product itself) generates heat that increases the base temperature of the product. In some instances (particularly in the case of product having a higher oil or moisture content), the warming of the product leads to the expression of oil, moisture, or resin from the product which can result in a tackiness that can further lead to clumping and residue buildup. Such adverse characteristics can, for example, block or bind automated components, interfere with the flow of product through the automated system, and lead to inaccurate filling of cones all of which lead to waste either in the form of lost product or lost productivity. In one example, clumping of dried leaves leads to bridging of product in funnel hoppers which bridging blocks the flow of product through the hopper and prevents the continued packaging of cones.

The automatic folding of the paper cone may be uneven if not carefully controlled. An uneven fold interferes with the infusion of a filled cone, the uniformity of lighting a filled cone, and the ability of a folded cone to maintain its fold. Therefore there is a need to ensure uniformity and greater plastic deformation of the distal ends of cones when folding the cones in an automated process.

SUMMARY

The present system provides an apparatus that may be utilize in conjunction with a method that accurately and uniformly fills paper cones with loose particles and closes the cones to prevent the particles from escaping the cones. While embodiments may generally be described herein as filling the cones with crumbled plant matter, such as crumbled dried leaves, it should be understood that any loose particles that could fit within the cone could be used as a filling for the cone without departing from the general scope of the apparatus and system. For simplicity, all such loose particles will simply be referred to herein as "leaves," but the use of that term herein in no way limits the apparatus to only packaging organic plant matter. It should be understood that while "paper" is a common substance to be used for cones, that term is used generically herein for any relatively thin, flexible, flammable substrate and is not strictly limited to traditional paper. It should be understood that the term "cone" need not be a traditional cone with a point at one end, but may be of any generally cylindrical shape or shape having a greater length than width (or diameter, where the term "width" as it is used in describing the width of an object having a circular cross section is the diameter), though preferably the shape of a truncated traditional cone or frustum.

The present apparatus, system, and method overcome the shortcomings of the previously described manual and automatic filling methods by ensuring that the leaves are uniformly and consistently packed into the cones. The process is automated, allowing for consistent packaging and uniformity in the final product. It expedites the overall process of packing the cones. The present apparatus, system, and methods include a number of sub-components that individually perform packing functions. The sub-components each individually overcome different problems that occur when manually packaging leaves in cones.

A general system for automatically filling cones is described in United States PCT patent application serial number PCT/US19/26711, which as noted is incorporated herein for all purposes. The present disclosure improves upon that system through the implementation of a cooling circuit that maintains a consistent temperature of particular subcomponents of the overall apparatus. For example the cooling circuit comprises a cooling unit and a number of hoses for circulating a coolant (for example a 50%-50% mix of glycol and water). The hoses connect to a feeder (such as a hopper or a conveyor) that transports product through a portion of the apparatus. The hoses daisy-chain from the feeder to additional components, such as a coarse grind wheel, a feed gate, and a fine grind wheel. The one or more grind wheels assist in breaking up the product and moving it through the assembly. The coolant fluid circulates through the components to cool each, which in turn cools the product in the assembly and maintains the product at a consistent cool temperature (preferably between 35° F. and 55° F., and more preferably 35° F. and 40° F. particularly when also injecting a heated fluid during the filing process). The cool temperature tends to prevent the buildup of frost or ice crystals on in the apparatus while simultaneously preventing the product from releasing moisture, oil, or resin that otherwise can cause clumping or residual buildup.

A folder sub-component having an air assist may be utilized to complete the packaging of the cone. The folder sub-component properly orients the cone. Folding fingers may precisely bend a portion of the cone and a folding tip compresses the bent portion of the cone to close it. Alternatively, an iris folding system may be utilized in place of the folding fingers to close on the distal portion of the cone and compress it against the folding tip. The folding tip may have an outer circumference that is configured to surround the distal end of a cone, particularly the distal rim of the distal end of a cone. It may also include a central portion, such as an axial pin. In some embodiments, the folding tip is adapted to apply one or more of vacuum pressure and positive air pressure to the cone. For example, suction may be applied by the folding tip circumferentially to the exterior of the distal end of the cone and air pressure may be injected into the interior of the cone through an axial pin of the folding tip. The folding fingers or iris release and the folding tip drives down onto the distal end of the paper cone to fold the distal rim and at least a portion of the distal end into the interior cavity of the cone, thereby folding the distal end of the cone. The use of the application of vacuum and air pressure increases the stiffness of the paper cone just prior to the folding tip folding the distal end of the cone. That increases the uniformity of the fold which enhances the plastic deformation of the distal end leading to a more reliable fold.

BRIEF DESCRIPTION OF THE DRAWINGS

FIG. 4A is a perspective view of an embodiment of a folder tip with an axial pin.

FIG. 4B is a plan view of an embodiment of a folder tip with an axial pin.

FIG. 4C is a cross-sectional side view of an embodiment of a folder tip with an axial pin.

DETAILED DESCRIPTION OF EMBODIMENTS

Figure 1:
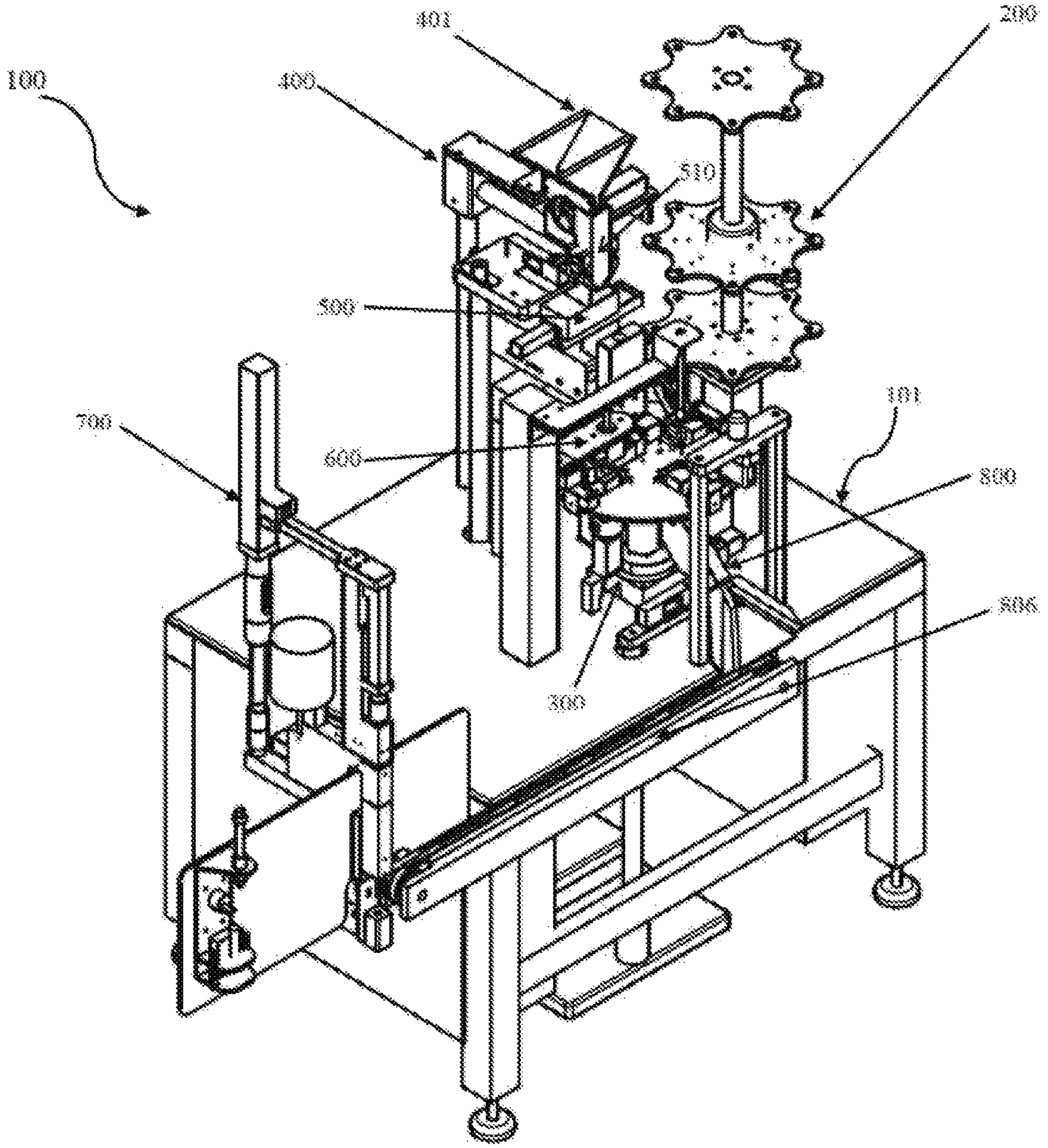
FIG. 1 is a perspective view of an embodiment of the apparatus and system generally depicting the relationship between various sub-systems of the apparatus.

Throughout the specification, wherever practicable, like structures will be identified by like reference numbers. In some figures, components, such as additional electrical connections and tubing (such as vacuum tubing and pneumatic tubing) have been omitted for clarity in the drawings. Additionally, in some figures repetitive structures, such as multiple actuators have been omitted. In such cases exemplary components are provided for explanatory purposes and it should be understood that other similar devices in the drawings may be provided with similar components. Unless expressly stated otherwise, the term "or" means "either or both" such that "A or B" includes A alone, B alone, and both A and B together.

FIG. 1 generally depicts an embodiment of a packaging assembly 100. Embodiments may include a carousel 200, a cone conveyor 300, a hopper assembly 400, a leaf conveyor (not shown), a grinder hopper 401, a packing station 500, a weigh station 510, a folder station 600, and a quality control station 800. Additionally, the packaging assembly may include a conveyor 806, and an injector station 700 (which may be integrated with the folder station or be a separate subassembly). The various subassemblies may be mounted to a table 101.

The packaging assembly 100 is also equipped with a number of actuators. The actuators move the various components of the assembly into their proper positions. In one embodiment, the actuators are generally pneumatic actuators and electric motors, though it should be appreciated by one of ordinary skill in the art that any actuator could be used. By way of non-limiting example, continuous speed motors, variable speed motors, servo motors, hydraulics, or magnetic actuators could be used. By way of further example, an actuator could be in the form of a simple valve or switch that the control system operates to permit a hydraulic or pneumatic fluid to flow through the system and provide the force required by the system. A vacuum pump and vacuum tubing may also be utilized to control airflow in the system.

An electrical control system may be used to monitor and control the operation of the system and packaging assembly. The electrical control system may include dedicated circuits, programmable computer hardware, firmware, software, controllers, or a combination thereof. The control system coordinates the operation of the apparatus and system and particularly coordinates the actuators and the vacuum and pneumatics as well as utilizing sensor data, preset parameters stored in the control system, or a combination thereof. While it generally is advantageous to utilize a control system of a self-contained, locally oriented computer (with accompanying input and output devices such as a display, keyboard, mouse, touch screen, voice command control, etc.) to reduce latency in the feedback and command loop between the sensors, computer, and actuators, it is contemplated that parts of the control system could be organized in a distributed manner, with sub-control systems operating portions of the packaging system while networked with a main computer controller, or even that portions of the control system could be located off-site and connected over the internet.

In one embodiment, a computer monitors the sensors of the packaging assembly, and coordinates the operation of the actuators of the packaging assembly. Simultaneously, the computer records data respecting the operation of the packaging assembly. For example, the computer records the time each actuator is activated. The computer system may further compile the number of operations of each actuator to determine whether a completed product should have been created. For example, the computer identifies that the actuators of the carousel were activated, followed by the activation of the de-nesting fingers. A feedback sensor on the de-nesting fingers informs the computer that a cone was successfully withdrawn from the carousel and the computer logs that data. The computer then records activation of the cone conveyor and the activation of a weigh station sensor and weigh station actuator (indicating that product has been fed to the cone). The computer system logs the activation of the packing rod actuator followed by the activation of folding finger actuators (indicating that the filled cone has been completed), the computer then logs the die actuator (releasing the filled cone) followed by sensor feedback from quality control sensors (such as recording the weight of the cone, an image of the cone, or a simple check that the cone is present). The computer then records whether the reject actuator was activated to determine whether the cone was accepted or rejected. The computer records the subsequent activation of the actuators of the fluid injecting station, including the operation of the fluid pumps to record whether the cone was filled with a fluid core, and how much fluid was deposited in the cone. Subsequent quality control data (and acceptance/rejection data) as described previously may be recorded. In some embodiments the fluid filling occurs prior to any quality control. By coordinating the recording of the data pertaining to the actuators and sensors, the computer system is able to track individual cones as they progress through the packaging system.

The computer control system may also be connected to a cooling or refrigeration unit. One example of a suitable cooling unit is an aluminum block containing or affixed to a reservoir. A number of thermoelectric chips may be affixed to the aluminum block, such that, when energized, the TECs cool the block thereby cooling any refrigerant fluid in the reservoir within the block. A sensor may monitor the temperature of the coolant and provide feedback to the computer which in turn controls the temperature of the TECs and by extension the coolant. Other conventional refrigeration units will be apparent to those of ordinary skill in the art.

The refrigeration unit is connected to certain subcomponents of the assembly where it is desirable to maintain a consistent, cool temperature. These subcomponents are areas where the movement of the assembly or the product through the assembly tends to create heat that warms the product.

Figure 2B:
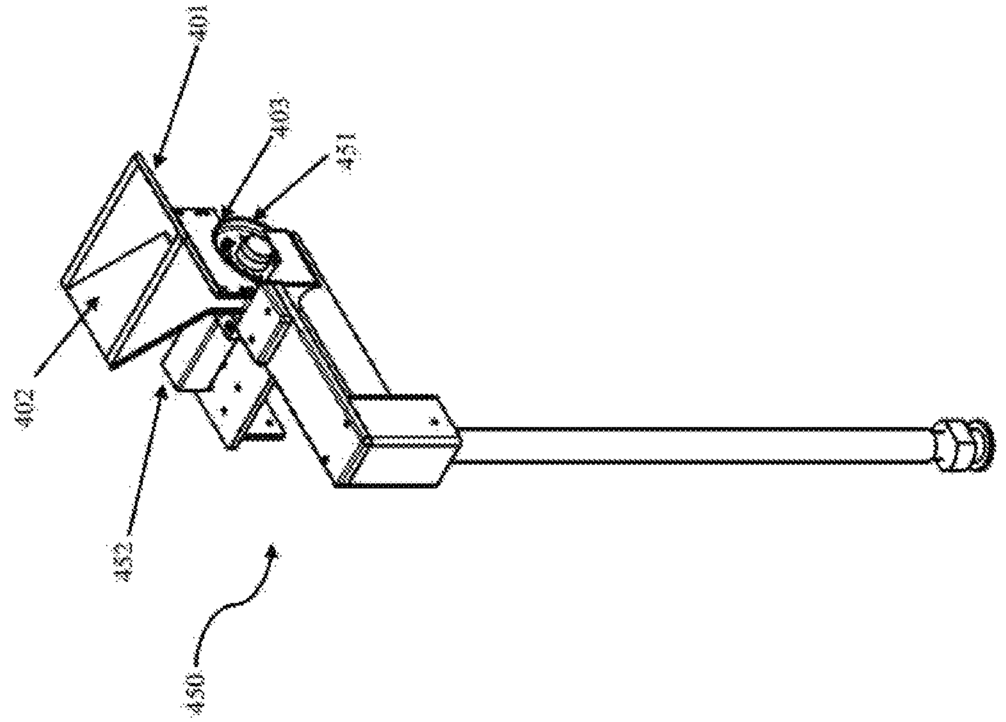
FIG. 2B is an alternative perspective view of an embodiment of a grinder hopper and wheel.
Figure 2A:
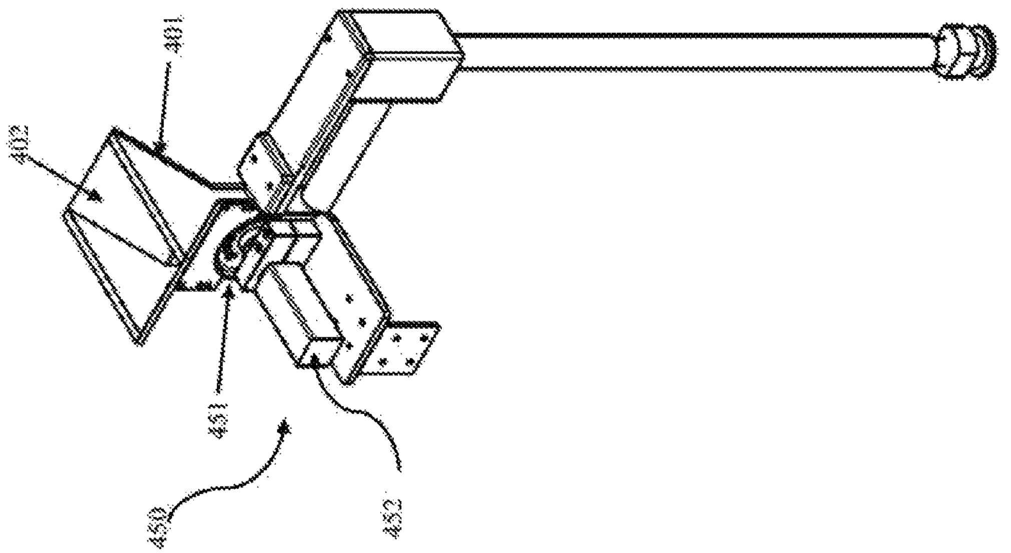
FIG. 2A is a perspective view of an embodiment of a grinder hopper and wheel.

FIGS. 2A and 2B depict one embodiment of a grinder hopper assembly 450 that may be utilized. The grinder hopper assembly 450 includes a hopper 401 having a hopper inlet 402 and a hopper outlet 403. At the outlet of the hopper is a wheel 451 that is operated by a wheel actuator 452. The wheel may include a textured surface so as to function as a grinding wheel. In one embodiment, the hopper inlet 402 funnels toward the hopper outlet 403, and the outlet is approximately the same width as the wheel 451. A portion of the wheel fits within the hopper outlet so as to substantially block the flow of leaves out of the hopper while leaving a gap between a surface of the wheel and a portion of the hopper. The control system sends a signal to the wheel actuator to drive the wheel. When leaves are in the hopper, as the wheel spins it draws leaves through the gap between the wheel and the hopper. When a textured wheel is used, the spinning of the textured wheel may grind the leaves as the leaves are forced between the surface of the wheel and the hopper at the hopper outlet. As the leaves exit the outlet, they may be deposited into a conveyor or alternatively deposited directly into a weigh station or other subassembly.

The grind hopper 401 is prone to a buildup of heat due to the friction created by the spinning wheel 451 and the rubbing of product against product as the product moves through the hopper. It is particularly problematic in that subassembly because, as product heats up, it may have a tendency to clump and release fluid that further leads to a tacky, residual buildup in the hopper, on the wheel, and at the outlet. The buildup restricts the free flow of product through the system. Additionally, as the product clumps, it has a tendency to bridge in the hopper and thereby completely block the flow of product.

Accordingly, both the hopper and the grinding wheel may be connected to a coolant flow circuit that is in turn connected to the refrigeration unit. For example, the hopper may be formed of aluminum and contain a sealed circuitous flow path that enables coolant to flow into the flow path from the refrigeration unit and out of the flow path to a downstream portion of the flow circuit and eventually back to the refrigeration unit. The coolant is thereby able to chill the hopper and maintain the temperature of the hopper at approximately the temperature of the coolant in the coolant circuit. As the product is fed into the hopper, the cooled hopper in-turn cools and maintains the temperature of the product to prevent the product from releasing fluid. The fluid circuit may also include the grind wheel 451. Coolant may be fed to the wheel through a hose in conjunction with a rotary union, and is then allowed to flow out and continue through the coolant circuit.

FIGS. 7A through 11B depict an embodiment of a product conveyor system equipped with a cooling circuit. The embodiment includes a hopper 7001, one or more conveyors (such as 7002) and a feeder 7004. The hopper may be formed with an hourglass shaped cross-section where an upper chamber tapers toward a narrow neck portion and the lower chamber flares from the neck portion to the conveyor below the hopper. Generally, the upper chamber may be larger than the lower chamber. The hourglass shape helps prevent bridging of product in the hopper. The conveyor may include a gate 7019 to regiment the volume of product exiting the hopper. Because the conveyor 7018 is moving below the hopper, product may pile up and churn at the gate 7019, thereby creating friction and heat. The hopper and conveyor may be connected to a cooling circuit to dispel the heat and keep the product cool.

Various portions of the product conveyor system may be connected to a cooling circuit. As shown in FIGS. 7A-11B, the hopper 7001 may include cooling plates 7010, 7011, 7012, 7013. In one embodiment, the cooling plates contain an internal path through which a coolant fluid may flow. The cooling plates may be connected by hoses, for example, 7014, 7015, which may in turn be connected to additional cooling plates to and a coolant reservoir (not shown) to form a cooling circuit. Additional cooling plates may be provided in association with the conveyor(s). For example, cooling plate 7016 and 7017 cool conveyor belt 7018. In that way, the hopper and conveyor belt are able to keep the product cool as it moves through the system.

Feeder 7004 is shown in FIGS. 10A-11B. The feeder may include channel 7019 to guide product on the conveyor toward the end of the conveyor and prevent excess product from building up and spilling over the conveyor. In the depicted embodiment, the channel is comprised of a pair of plates 7020 and 7021. The feeder may also include a grinding wheel 451 and a dynamic gate 7022. In one embodiment, the edge of the conveyor 7018 may be used as the grinding wheel as it rotates past the dynamic gate 7022. The dynamic gate may be formed of a gate plate 7023 and a linkage 7024 that is connect to a pin 7025 that is eccentrically mounted to a wheel 7026. The gate plate 7023 may also be connected to the plates 7020 and 7021 by pin 7030 so as to allow the gate plate to pivot with respect to the plates. The wheel may be connected to an actuator 7027. The actuator is further connected to a controller of the machine, such as a computer or microprocessor. The controller is able to transmit instructions to the actuator to rotate the wheel and thereby control the operation of the dynamic gate. In one embodiment, the actuator is controlled intermittently such that it rotates the wheel 7026 clockwise to open the gate, then counterclockwise to close the gate and press the leaves against the grinding wheel 451. In that way, the dynamic gate may be pulsed against the grinding wheel repeatedly to simultaneously allow leaves to pass and grind leaves. Also, by controlling the gate and how far the wheel 7026 is rotated counter clockwise, the coarseness of the grind of the product can be controlled.

Additionally, the conveyor and dynamic gate may be controlled by the control system which also receives feedback from the weigh station. The controller monitors the feedback of the weigh station and utilizes that feedback to control the speed of the conveyor and the operation of the dynamic gate. When the weigh station indicates that there is little weight, the speed of the conveyor increases and the dynamic gate is opened to provide a larger gap. As the weight increases, the speed of the conveyor is decreased and the dynamic gate is forced closer to the grinding wheel to grind the product more finely and slow the deposit of the product into the weigh station. The control system stores in memory a set weight for a product (e.g. the amount of product necessary to fill one cone). As the weight approaches the set weight, the controller reduced the speed of the conveyor and adjusts the spacing of the dynamic gate to more precisely control the deposition of product into the weigh station.

In some embodiments, the gate plate 7023 includes an internal fluid pathway that is connected to the cooling circuit, for example by hoses 7028 and 7029. The cooling circuit helps maintain the product at a cool temperature, preferably between 35° F. and 55° F. during the packaging cycle. It was found that utilizing the cooling circuit of the present system in conjunction with a coolant fluid in the range of 35° F. and 40° F. was sufficient to maintain the preferable temperature of the product during the packaging cycle. Lower temperatures risk creating ice crystals from ambient humidity which could negatively impact the process, and higher temperatures tended to be ineffective for overcoming the heat generated in the system. The product may be fed from a refrigerated container into the hopper 7001. The cooling circuit maintains the temperature of the hopper, conveyor, dynamic gate and grinding wheel, and thereby controls the temperature of the product being feed as it moves through the system to be deposited into cones by dissipating heat, for example that may generated through friction.

Keeping the product cool further helps when injecting a fluid core. After the product is packed into cones, the filed cones are ready for a fluid injection. To keep the fluid free flowing, it may be heated. Because of that, depending on the type of fluid utilized, the fluid may undergo a decarboxylation process. For example, before the heating and injection process occurs at the fluid injection station, a concentrated oil extract may first be decarboxylated using techniques known in the industry (such as by heating the oil for extended amounts of time until the bubbling ceases in the liquid). This step is necessary for certain extracted concentrate oils (e.g. shatter, batter, sauce, live resin extracts) because those oils will off-gas and bubble when heated to the point of sufficiently low viscosity for fluid injecting. The bubbles can interfere with the pumping mechanism and fluid circuit by creating variable pressure (e.g. air pockets in the fluid lines) when pumping resulting in inaccurate amounts of the oil being injected. Thus, by first decarboxylating the oil, the fluid injection station can reliably heat the fluid without disrupting the fluid flow and pumping process to thereby reliably inject the fluid into the cone.

However, once injected, it is preferable that the fluid is chilled to prevent the fluid from oversaturating the product. By keeping the product cool during the packing stage, the product itself assists in cooling the fluid as the fluid is injected into the center of the cone. Thus, the cool product helps reduce the temperature of the fluid, increasing fluid viscosity and maintaining the fluid as a central core within the cone. The filled cones may then be transported to a refrigerated chamber to further chill the fluid.

Figure 3:
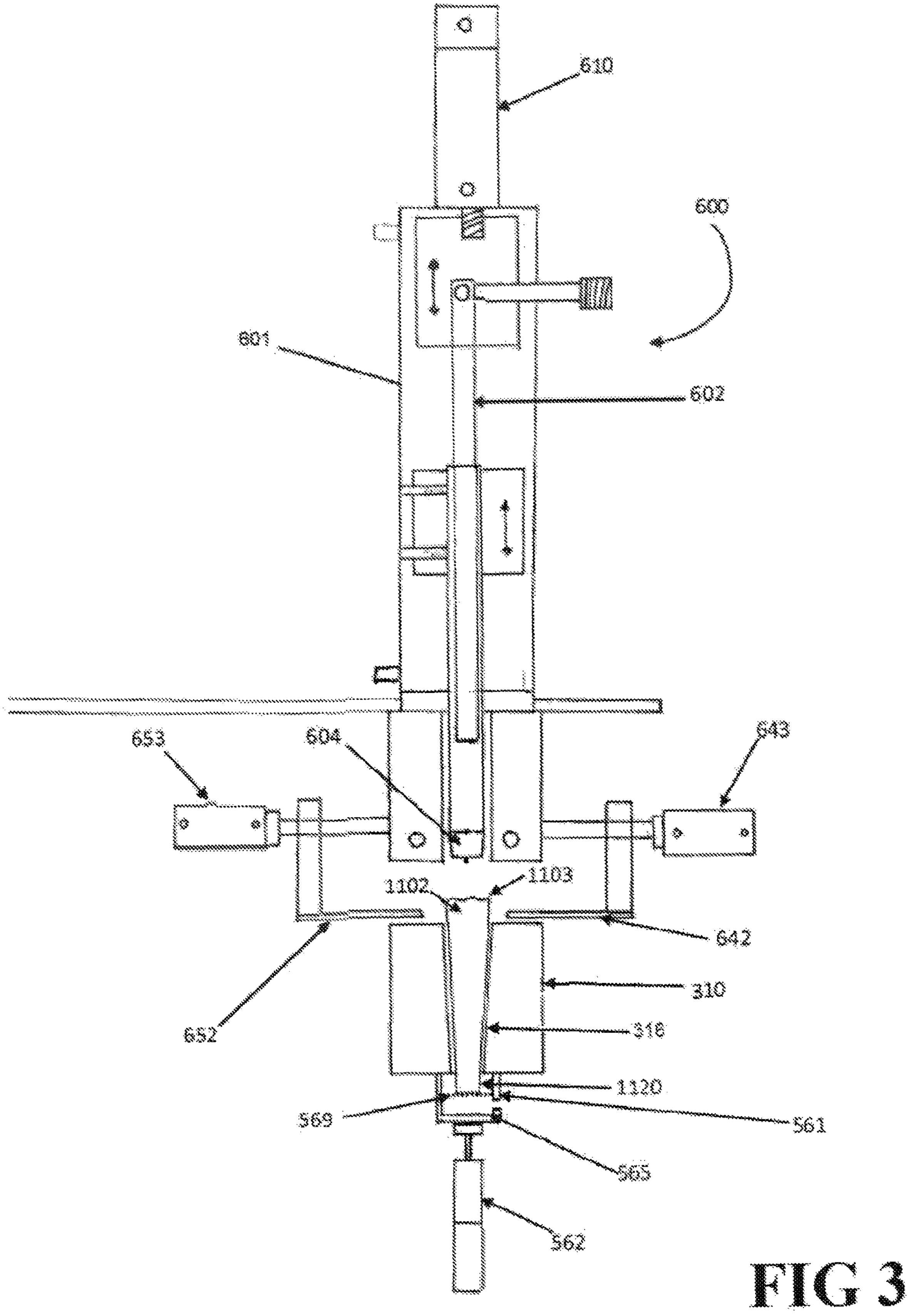
FIG. 3 is a cross-sectional side view of an embodiment of a folder station with an unfolded cone.

FIG. 3 generally depicts one embodiment of a folder station. The folder station may include a housing 601 that accommodates a folding rod 602. A folder tip 604 is affixed to (or integrated with) a distal end of the folding rod 602, while a proximal end of the folding rod 602 is associated with a folding rod actuator 610.

In one embodiment, two folding fingers are utilized. With reference to FIG. 3, one embodiment includes folding fingers 642, 652, and folding finger actuators 643, 653. The folding fingers each include, for example, a substantially V-shaped groove (not shown) that encompass a distal end of a cone 1102 when the folding fingers are brought together.

To fold the cone, a die 310, containing filled cone 1120 is oriented below the folding station 600 such that the folder tip 604 and cone 1120 are axially aligned. In one embodiment, a cone support 561 supports the proximal end of filled cone 1120. The cone support may be integrated with or connected to support actuator 562 that may raise to contact (and in some embodiments lift) the filled cone 1120 when the cone conveyor is aligned with the folder tip. The lifting of the filled cone 1120 can assist in ensuring that the distal end of the cone 1102 protrudes from the die 310 for proper folding. In one embodiment, the cone support may attach to the cone (such as through suction or mechanical clamping). In one embodiment, folding finger actuators 643, 653 cause the folding fingers 642, 652 to engage with distal end 1102 of the filled cone 1120 and cause the distal end 1102 of the cone to deform in preparation for folding the cone. The folding fingers converge on the distal end, compressing the paper of the distal end toward the center axis of the cone.

Figure 4D:
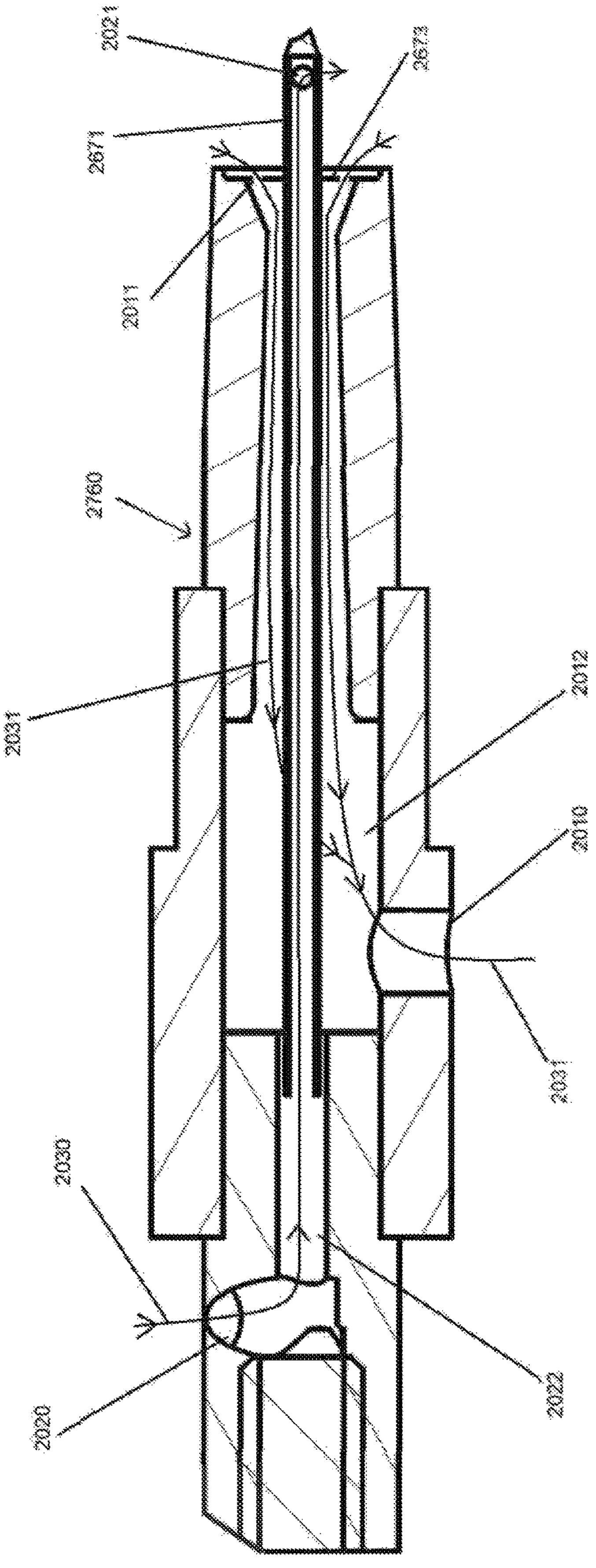
FIG. 4D is a cutaway view of an embodiment of a folder tip having vacuum and air pressure chambers.
Figure 5B:
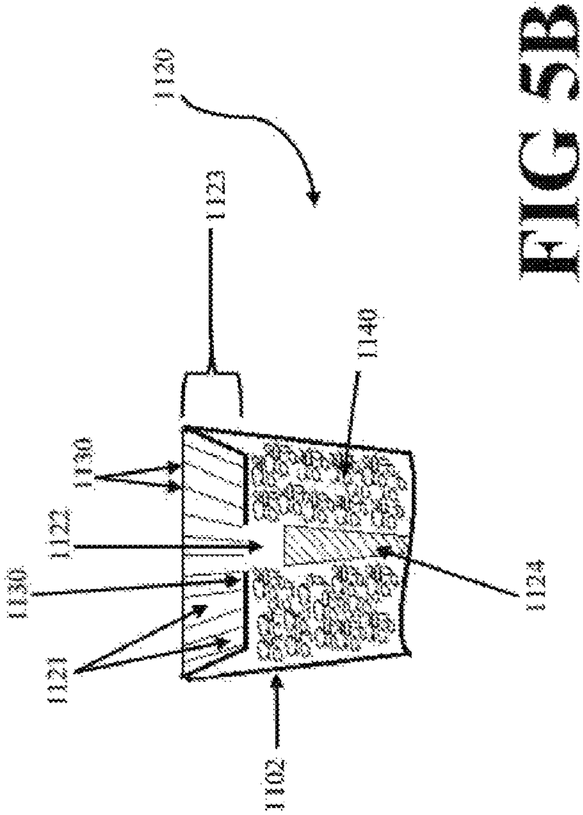
FIG. 5B is a cross-sectional side view of a distal end of an embodiment of a filled cone with a fluid core folded by an embodiment of the folder tip with an axial pin.
Figure 5A:
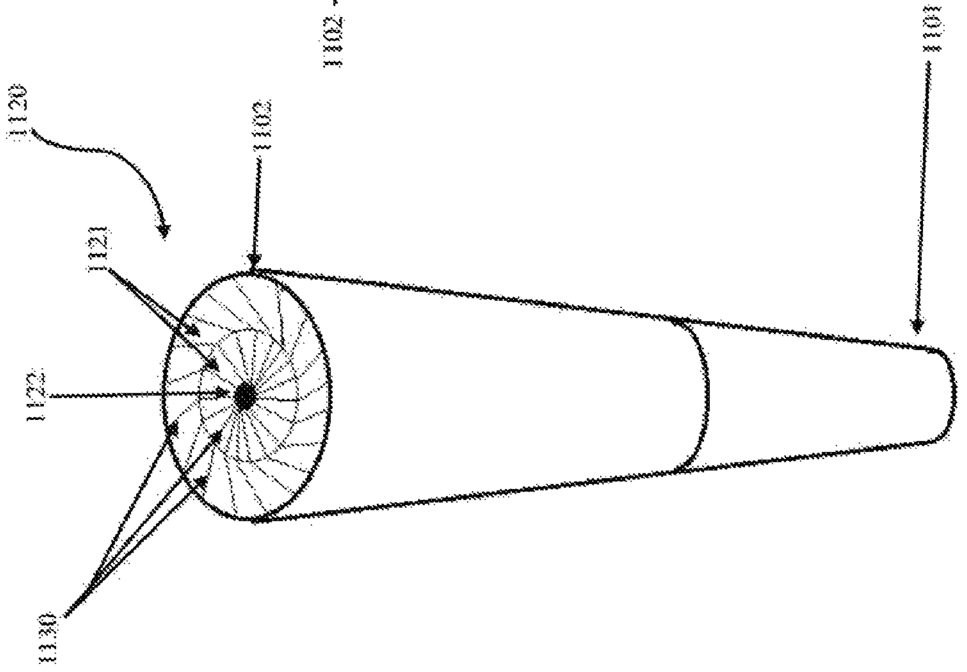
FIG. 5A is a perspective view of an embodiment of a cone folded by an embodiment of the folder tip with an axial pin.

With reference to FIGS. 4A, 4B, and 4C, there is depicted an embodiment of a folder tip 670 and with reference to FIGS. 5A and 5B there is depicted both a perspective view of a filled, folded cone and a cross-sectional view of a distal end of a filled, folded cone 1120. In one embodiment, fingers 652, 642 may come together and press the distal end of the cone against a central portion of the folding tip, such as the axial pin 671. The folding tip 670 is then pressed into the distal end of the filled cone 1120, the axial pin 671 prevents the cone from fully enclosing the distal end, and when the folding tip is retracted, an access hole 1122 is formed in the folded paper 1121 of the filled cone 1120. Alternatively, the cone could be forced up into the folding tip, or a combination of movements could accomplish the same effect.

In one embodiment, the folding tip 670 includes and exterior circumferential surface 672, an interior circumferential surface 673, an axial pin 671, and a contact edge 674 as shown in FIGS. 4A-4C. Preferably the cross-section of the folding tip is circular, and preferably the diameter of the contact edge 674 is less than the largest diameter of the distal end of filled cone 1120. The exterior circumferential surface 672 of the folding tip 670 may be conical such that the angle $\alpha$ mates against the angle of the surface 316 of a die (for example die 310), see FIG. 3. The interior surface may also be conical. Preferably, the angle R of the interior surface is between 80° and 85°. The interior circumferential surface terminates at the axial pin and contact edge, respectively. During the folding process, the folding tip may be placed at the distal end of the filled cone 1120 such that a central portion, for example, the axial pin 671 is below the rim 1103 of the distal end 1102 of filled cone 1120. As the fingers 642 and 652 converge, the axial pin prevents the fingers from completely collapsing the paper of the cone, and the paper of the cone is pressed against the axial pin. The folding tip 670 is pressed toward the filled cone 1120 such that the paper of the distal end of the cone slides up the axial pin and is bounded by the interior circumferential surface 673. The contact edge 674 presses the paper of the cone into the leaves within the cone, crimping the paper of the cone in on itself (see generally, fold lines 1130 of the folded portion of the cone (1121) and into the cone while the axial pin prevents the paper of the cone from completely covering the leaves. In this way, a portion of the paper of the cone is pushed into an interior cavity of the cone, while a portion of the paper cone protrudes beyond the level of the leaves 1140 (and any fluid 1124 where the filled cone is injected with fluid) creating a circumferential lip 1123 around the cone. Also in this way, the end of the cone is folded and exhibits plastic deformation which thereby prevents the escape of leaves while leaving a small hole 1122 in the end of the cone. Thus, as shown in FIGS. 5A and 5B the filled cone 1120 has a proximal end 1101 (mouth) and a distal end 1102 (tip), a circumferential lip of paper 1123, folded paper 1121 inside the circumferential lip, and an access hole 1122, approximately in the center of the folded paper 1121 such that the rim 1103 of the filled cone 1120 is folded down and in toward the center of the diameter of the cone.

In one embodiment, the length of an unfolded cone is between approximately 4 inches and 4.5 inches in length. It was found that folding the distal end of the cone such that the folded portion pressed and contacted the leaves inside the cone was better suited to ensuring that leaves within the cone did not freely pour out of the cone when the cone was inverted (particularly in folded cones having an access hole 1122) and it improved lighting the distal end of the cone as opposed to leaving an air gap between the leaves in the cone and the folded paper. Additionally, it was found that folding the cone such that the circumferential lip 1123 extended between approximately 2 mm and 5 mm produced optimal results while maximizing the interior volume of the cone that could be filled with leaves.

A number of benefits were found when folding the tip of the cone to provide the access hole 1122 in the distal end of the cone as well as creating a circumferential lip of paper 1123 as opposed to completely sealing the cone either by a full button fold or by twisting the paper of the cone closed. One benefit is that the hole provides an access point for a needle that can then be inserted into the cone to fill the cone with a fluid core but without having the needle pierce through layers of cone paper. It was found that attempting to pierce through the layers of paper often displaced the leaves within the cone, or lead to uneven compacting of the leaves which detrimentally affected the burning of the cone. The hole ensures that the needle does not meet excess resistance from the paper, and is able to penetrate the length of the cone, through the leaves, without unnecessarily compacting the leaves or causing the paper to push into and displace the leaves at the top of the cone.

Additionally, the hole allows for the creation airflow through the cone when lighting the filled cone. As a flame is brought proximate to the filled cone, air may be drawn through the cone by creating a vacuum at the small diameter end of the cone, thereby drawing the flame into the cone to contact the leaves and core. That assists in lighting the center of the cone where the fluid core was deposited. Without the hole, when the tip is closed due to a complete fold or twisting closed of the paper, it is difficult to create a vacuum in the unlit cone. When a flame contacts a completely closed tip, it was found that the flame would light the paper, and then migrate, or run, down the side of the cone burning the paper rather than the leaves. While the leaves would eventually light, the run of flame tended to cause uneven lighting of the leaves (e.g. lighting the leaves in the vicinity of the run, rather than uniformly across the diameter of the cone) which contributed to an uneven burn rate for the filled cone. It also meant that the leaves along the outside of the cone (proximate to the paper) would ignited first, leaving the fluid filled core unlit. By adding the hole to the tip of the folded cone, when a vacuum is applied to the cone (drawing air in from the distal end and out through the proximal end), the flame is drawn directly into the center of the cone and into the fluid core, to (particularly where the fluid is a flammable oil) reliably light the core and centrally located leaves. That results in burning away of the folded paper first (before the paper of the cone surrounding and holding the leaves), which in turn helps contain the leaves as the cone burns, and it contributes more uniformly lighting and progressive burning of the leaves. It was found that providing a folding tip with the foregoing structure created more reliably uniform folds in the end of the filled cone and simultaneously provided an airflow hole in the paper cone.

Additionally, it was found that even with the access hole, leaves within the cone would not consistently uniformly light, and there was risk of flame running down the length of the cone. However, by forming the circumferential lip of paper, as the flame is drawn into the cone through the access hole, it lights the more flammable circumferential lip of paper concurrently. That is, the circumferential lip of paper provides a mass of material, more flammable than the leaves and which mass of material surrounds the distal end of the cone such that the paper lights the circumference of the distal end and forms a strong, uniform cherry at distal end while preventing flame from running down the side of the cone.

A further embodiment of a folding tip incorporating an air assist folding system is shown in FIG. 4D. The interior of the folding tip is shown for explanatory purposes. FIG. 4D shows folding tip 2670 including central portion such as axial pin 2671. The folding tip includes a vacuum outlet 2010, one or more vacuum inlets 2011, an air pressure inlet 2020 and an air pressure outlet 2021. As shown in FIG. 4D, the air pressure outlet 2021 is formed at the tip of the axial pin 2671. The air pressure outlet may be formed to eject air out of the sides of the axial pin rather than straight down out of the bottom of the pin. The air pressure inlet and air pressure outlet may be connected by a chamber 2022 formed within the folding tip. Similarly, the vacuum inlets 2011 and vacuum outlet 2010 may be connected by a second, separate chamber 2012 formed in the folding tip. The one or more vacuum inlets 2011 may be formed as holes in the interior circumferential surface 2673. In one embodiment the vacuum inlets are spaced evenly and circumferentially around the axial pin. Both the vacuum outlet and the air pressure inlet are connected to conventional pumps (not shown) suitable for applying vacuum pressure or air pressure as needed. Lines 2030 and 2031 depict the airflow paths of the air pressure and vacuum pressure, respectively. The pumps are connected to the control system which is thereby capable of operating the pumps.

Figure 6A:
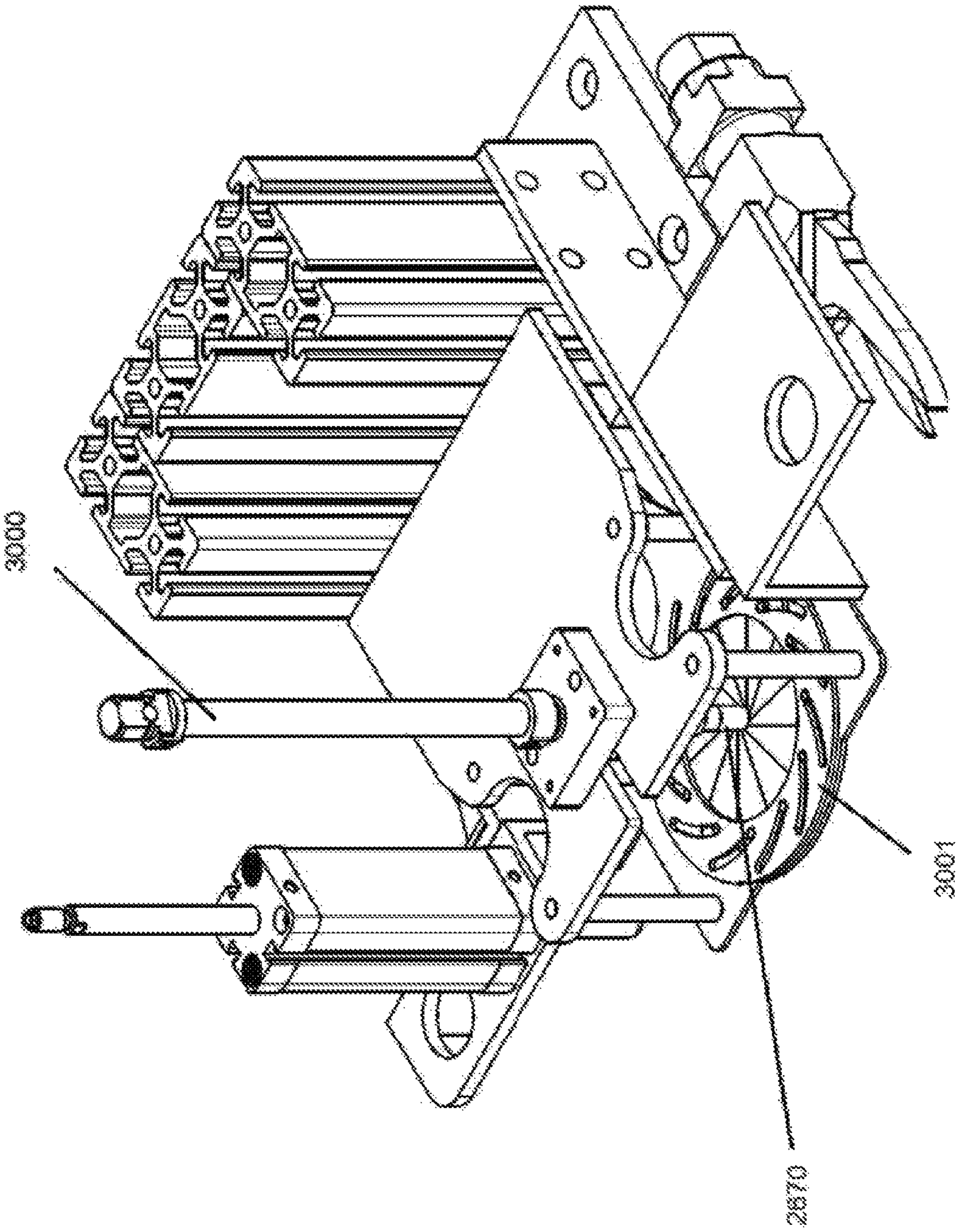
FIG. 6A is a perspective view of an iris folding station subassembly.
Figure 6B:
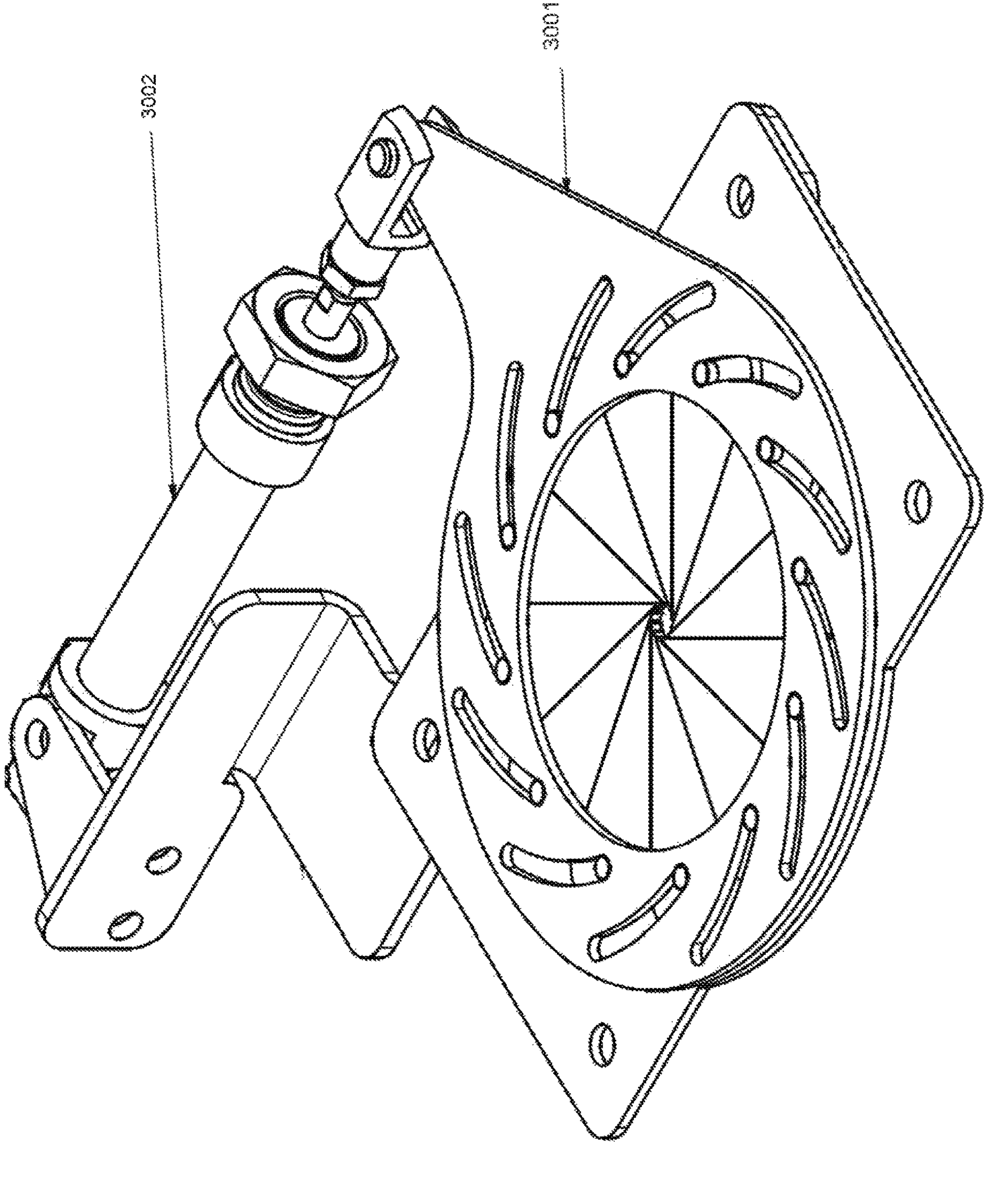
FIG. 6B is a perspective view of an iris portion of the iris station subassembly
Figure 7A:
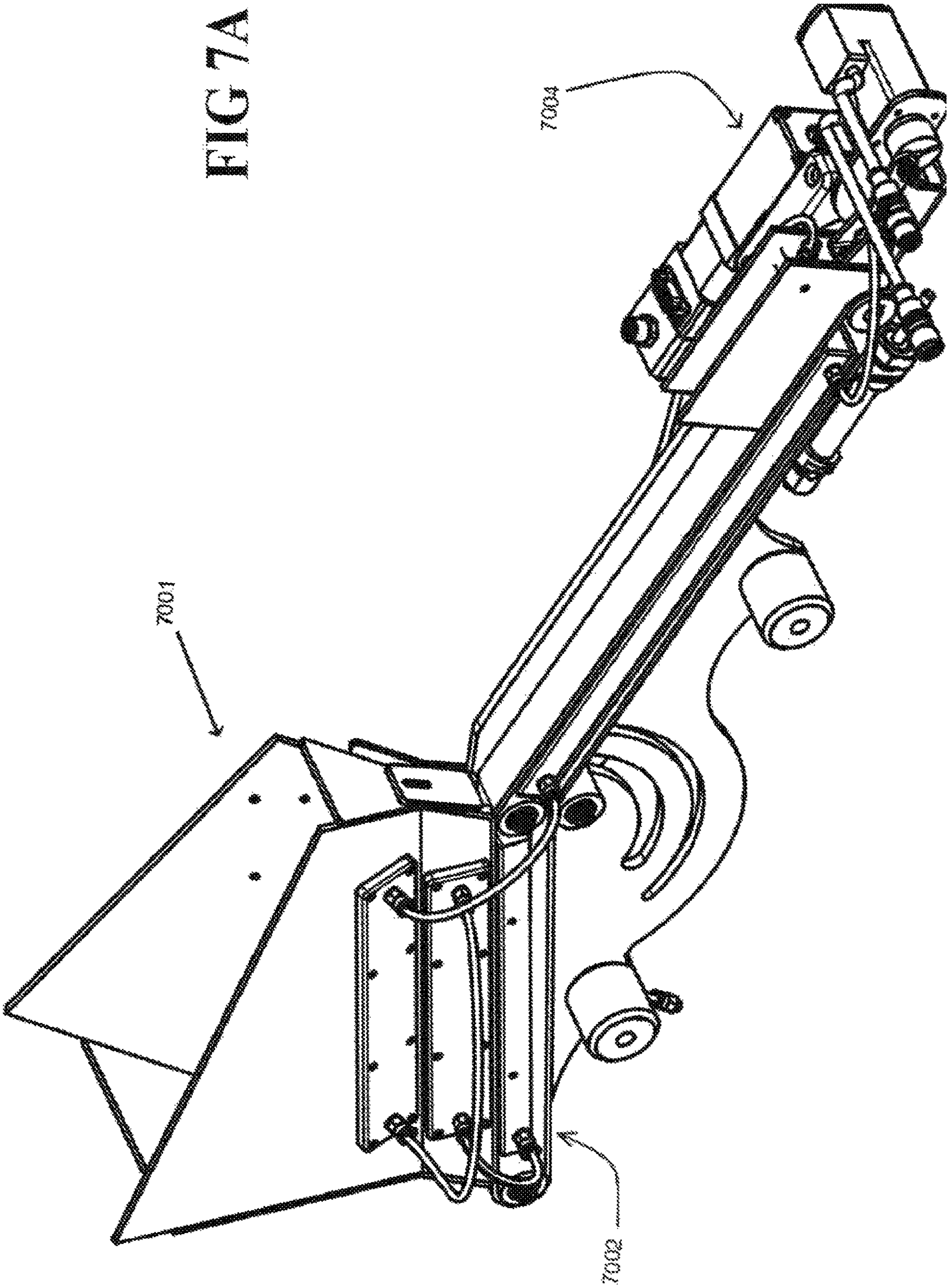
FIG. 7A is a perspective view of an embodiment of a hopper, conveyor and feeder assembly.
Figure 7B:
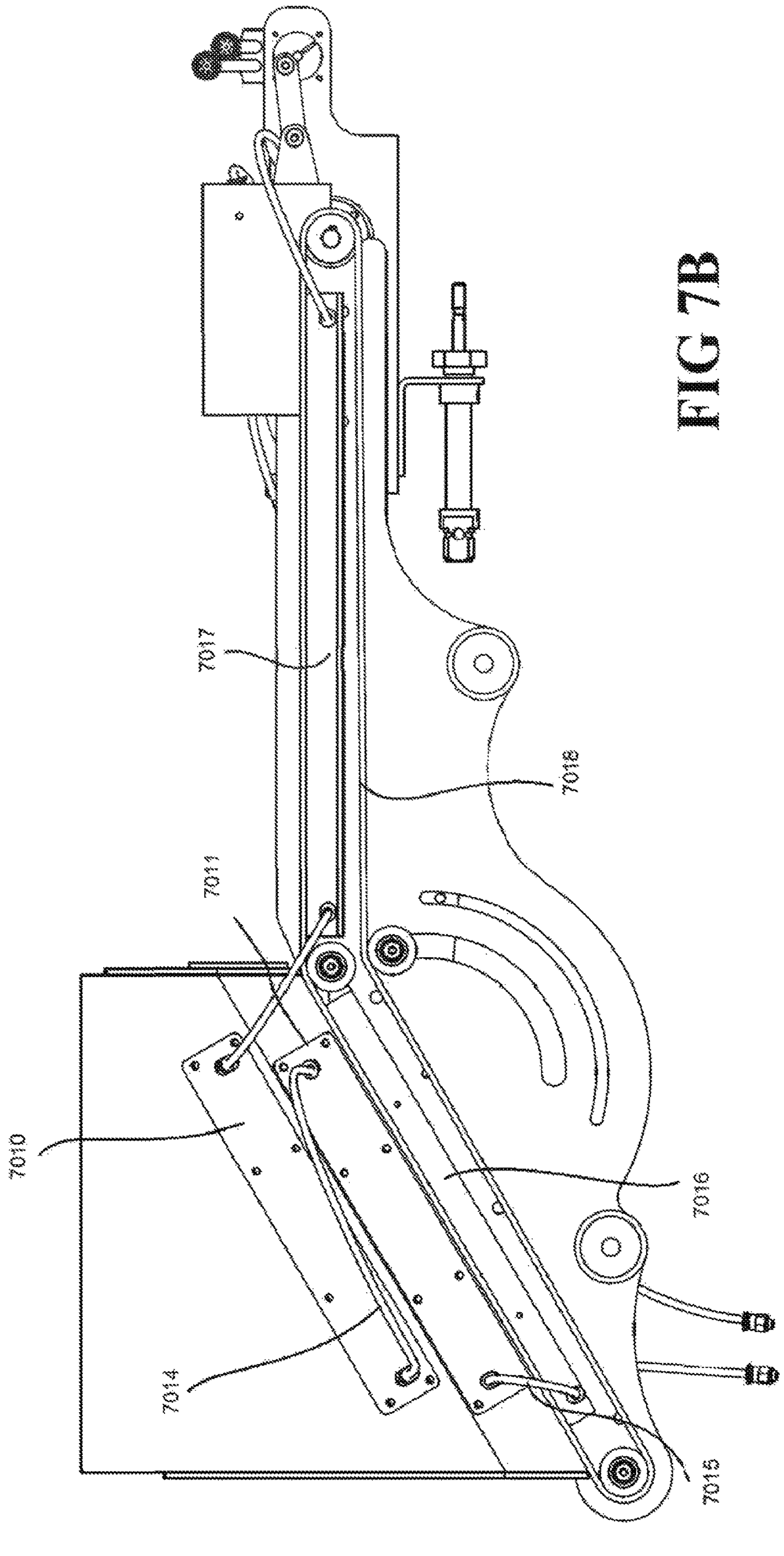
FIG. 7B is a side view of an embodiment of a hopper, conveyor and feeder assembly.
Figure 8B:
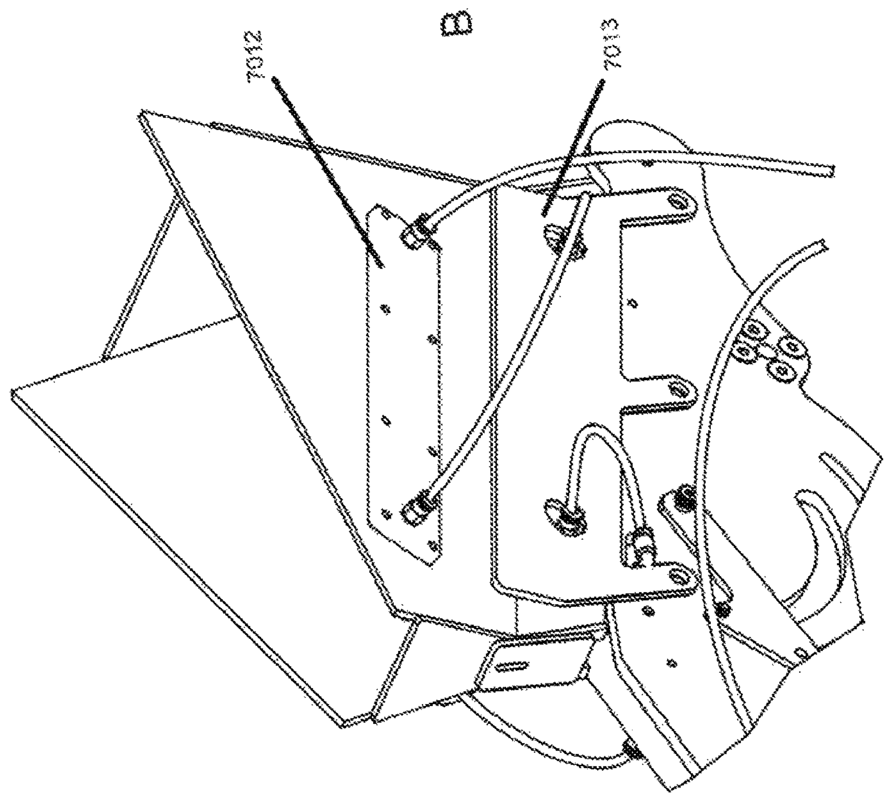
FIG. 8B is an enlarged view of an embodiment of a hopper.
Figure 8A:
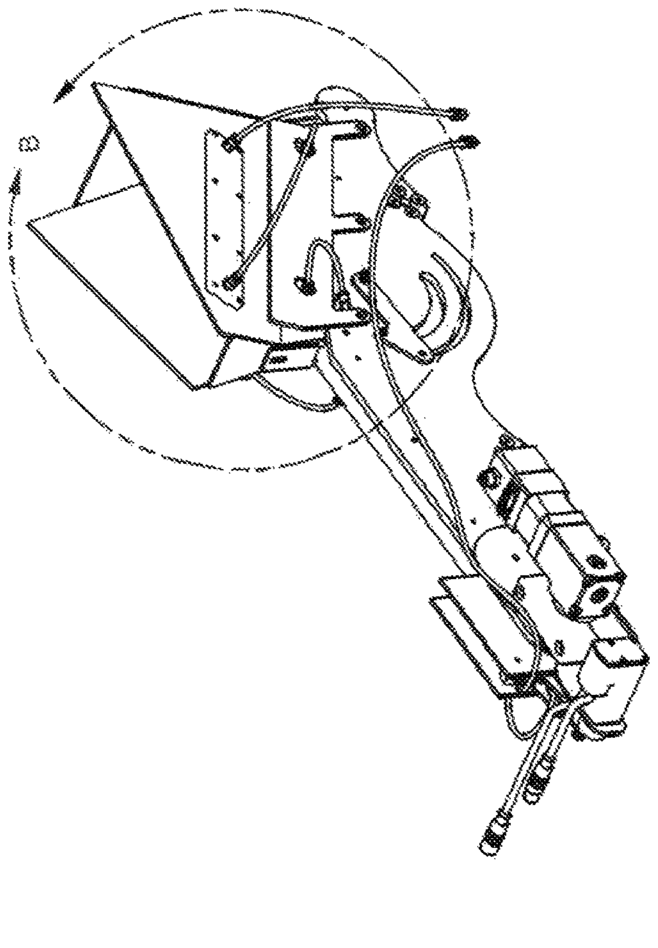
FIG. 8A is a perspective view of an embodiment of a hopper, conveyor and feeder assembly and including an indication of the portion of the assembly enlarged in FIG. 8B.
Figure 9B:
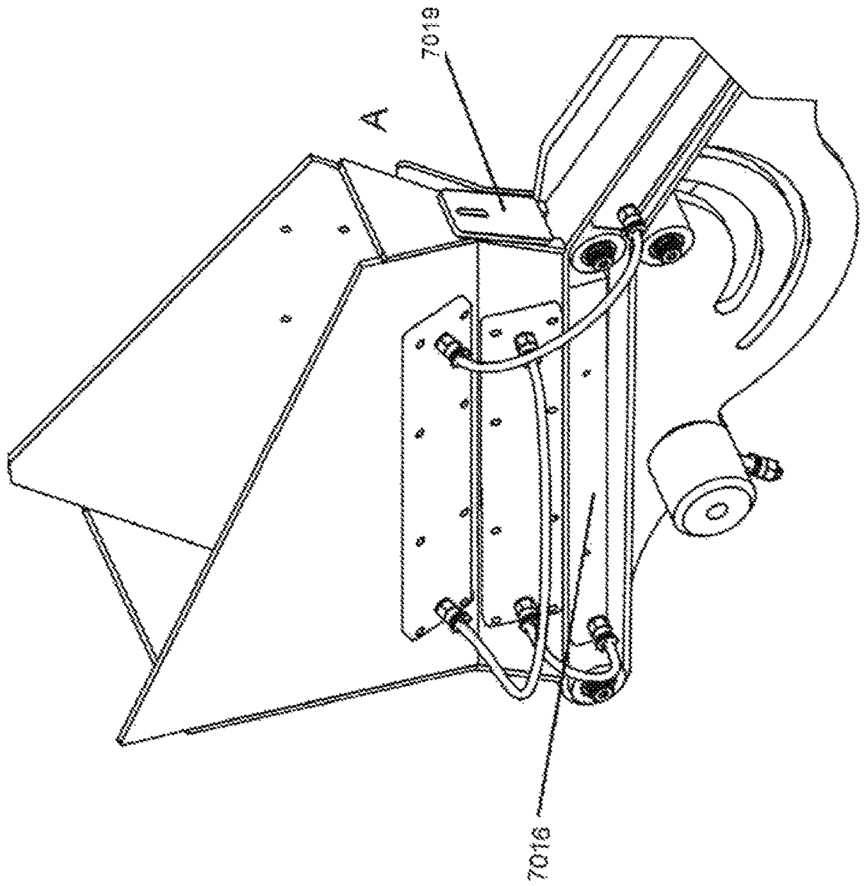
FIG. 9B is an enlarged view of an embodiment of a hopper.
Figure 9A:
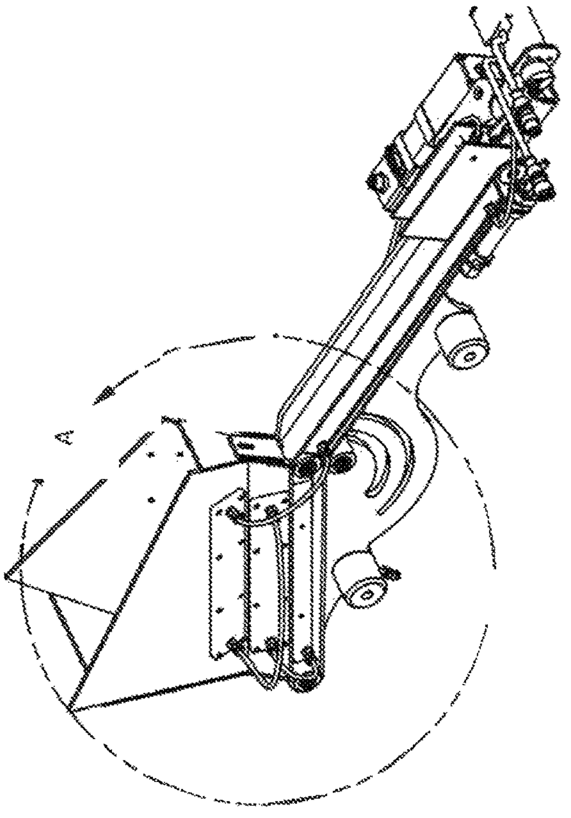
FIG. 9A is a perspective view of an embodiment of a hopper, conveyor and feeder assembly and including an indication of the portion of the assembly enlarged in FIG. 9B.
Figure 10B:
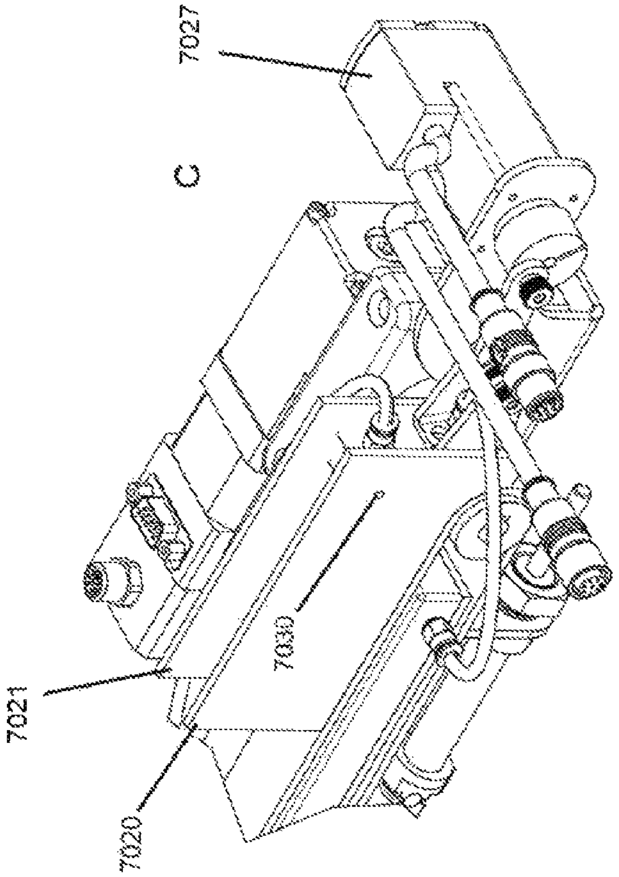
FIG. 10B is an enlarged view of an embodiment of a feeder assembly.
Figure 10A:
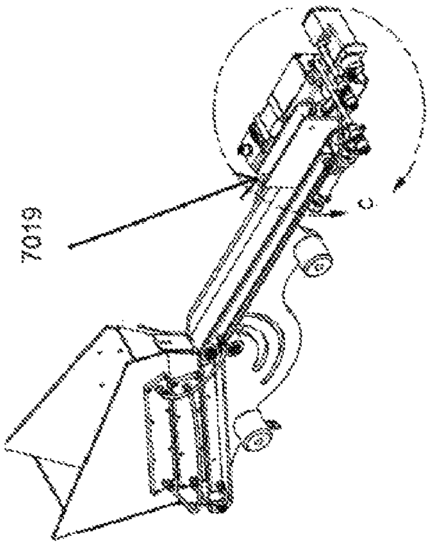
FIG. 10A is a perspective view of an embodiment of a hopper, conveyor and feeder assembly and including an indication of the portion of the assembly enlarged in FIG. 10B.
Figure 11B:
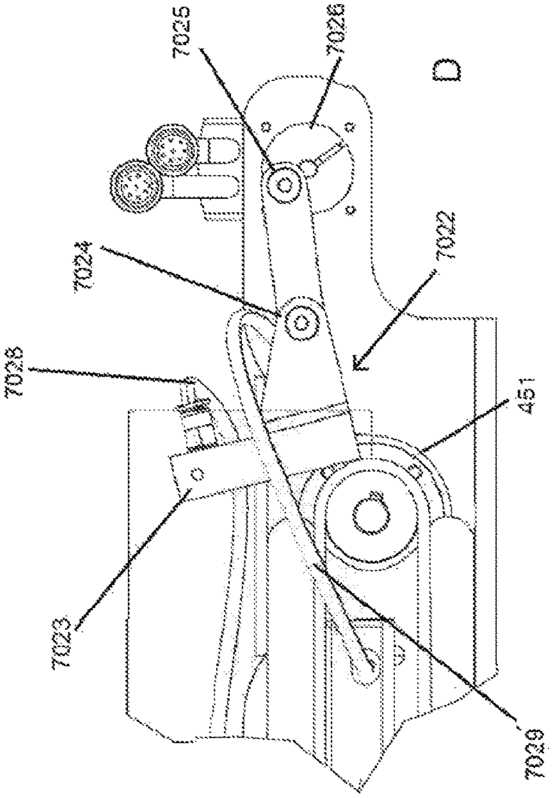
FIG. 11B is an enlarged side view having plate 7020 removed and showing a portion of the feeder assembly.
Figure 11A:
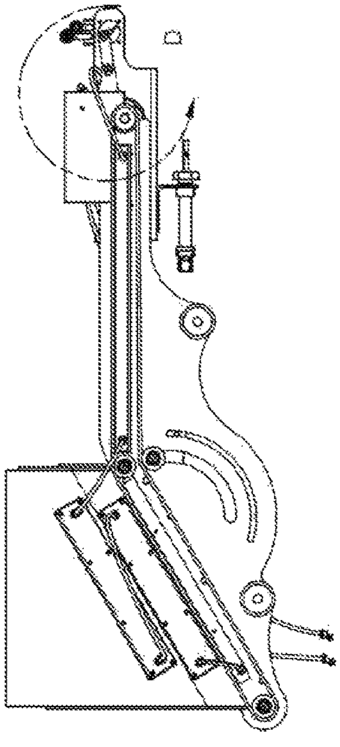
FIG. 11A is a side view of an embodiment of a hopper, conveyor and feeder assembly and including an indication of the portion of the assembly enlarged in FIG. 11B.

The foregoing folding tip may be utilized in conjunction with folding fingers 652 and 642. An alternate embodiment utilizes an iris to apply closing pressure against the distal end of a cone. FIGS. 6A-6B depict a folding station sub assembly utilizing an iris 3001 and the components thereof. The folding station includes a folding rod 3000, an iris 3001 and an iris actuator 3002 that opens and closes the iris. The folding rod terminates in a folding tip, for example, folding tip 2670. The iris, folding rod, folding tip, vacuum and air pressure work in conjunction to fold the distal end of a cone.

One method of folding a cone is as follows. A die 310 containing a filled, unfolded cone is axially aligned with the folding tip 2670. The relative vertical position of the cone with respect to the iris is adjusted such that the iris is below the rim 1103 of the distal end 1102 of the cone. The folding tip 2760 is positioned such that at least a portion of the axial pin 2671 is below the rim 1103 of the distal end 1102 of filled cone 1120 (that is, a central portion of the tip is positioned within the interior cavity of the cone), but also such that the contact edge 2674 remains above the rim 1103. The iris actuator actuates to close the iris, and thereby compress the distal end of the cone toward the central axis of the cone and may further compress the distal end against the axial pin. It should be appreciated that the movement and positioning of the cone and the axial pin with respect to the cone and the closing of the iris to compress the cone may occur as discrete steps or may occur simultaneously.

Once the distal end of the cone is compressed, for example, compressed against the axial pin, the vacuum is applied to the folding tip. The vacuum sucks the external surface of the distal end of the cone against the circumferential interior surface 2673 of the folding tip, next (or simultaneously), the air pressure pump is activated to apply air pressure through the axial pin to the interior cavity of the cone. With the axial pin inserted into the distal end of the cone, the air pressure outlet is within the interior of the cone when the cone is being pressed against the axial pin by the iris and when the exterior of the cone is being vacuumed against the interior circumferential surface. The air pressure may be applied to inflate the cone and further press the exterior of the cone against the interior circumferential surface. It was found that the combination of the application of exterior vacuum pressure in conjunction with interior air pressure stiffened the paper of the distal end of the cone. With the cone stiffened, the folding tip is forced down and into the distal end of the cone and the vacuum and air pressure are ceased. In practice, the iris may open just as the vacuum and air pressure are applied, and the folding tip may be forced into the cavity as the iris opens or shortly thereafter. The folding tip is then withdrawn from the cone and the distal end of the cone is left folded and exhibits plastic deformation.

While folding fingers could be used, it was found that the iris applied a more uniform pressure against the axial pin so as to limit instances of disorienting the cone during the folding process and limiting bunching of the paper cone in the event that one finger closed slightly faster than another. Additionally, the iris may be uniformly opened which eliminates interference between the iris and the folding tip as the folding tip is driven into the distal end of the cone and folds the distal end. Consequently, the air assist folding tip is able to produce a cleaner, more reliable folded distal end of the cone, while maintaining the axial hole in the cone. Such folded ends were found to have better plastic deformation to better hold the distal end of the cone closed even as the orientation of a cone was manipulated.

Although the present invention has been described in terms of various embodiments, it is to be understood that such disclosure is not intended to be limiting. Various alterations and modifications will be readily apparent to those of skill in the art. Accordingly, it is intended that the appended claims be interpreted as covering all alterations and modifications as fall within the spirit and scope of the invention.

What is claimed is:

1. A method of using a folding tip having an axial pin that extends beyond an interior circumferential surface having a plurality of vacuum holes oriented between the axial pin and a contact surface of the folding tip to form a folded package having an interior cavity at least partially defined by a circumferential distal end, the method comprising:

orienting an axis of the package that extends along a length of the package in axial alignment with the folding tip such that a portion of the axial pin is disposed within the package and applying mechanical pressure to the exterior of the distal end of the package so as to compress the distal end of the package toward against the axial pin;

releasing the mechanical pressure to the exterior of the distal end of the package and then drawing air through the interior circumferential surface of the folding tip and thereby applying vacuum pressure to the distal end of the package such that the distal end of the package is drawn toward the interior circumferential surface of folding tip;

while applying the vacuum pressure, causing the package and the folding tip to move relative to one another along the axis and thereby forcing the folding tip and the package together to fold a distal rim of the distal end of the package into the interior cavity.

2. A method of using a folding tip having an axial pin that extends beyond an interior circumferential surface having a plurality of vacuum holes oriented between the axial pin and a contact surface of the folding tip to form a folded package having an interior cavity at least partially defined by a circumferential distal end, the method comprising:

orienting an axis of the package that extends along a length of the package in axial alignment with the folding tip such that a portion of the axial pin is disposed within the package;

drawing air through the interior circumferential surface of the folding tip and thereby applying vacuum pressure to the distal end of the package such that the distal end of the package is drawn toward the interior circumferential surface of folding tip;

while applying the vacuum pressure, causing the package and the folding tip to move relative to one another a long the axis while simultaneously applying positive air pressure to the interior of the package as the package and folding tip move relative to one another along the axis thereby forcing the folding tip and the package together to fold a distal run of the distal end of the package into the interior cavity.

3. A method of using folding tip having an axial pin that extends beyond an interior circumferential surface having a plurality of vacuum holes oriented between the axial pin and a context surface of folding tip to form a folded package having an interior cavity at least partially defined by a circumferential distal end, the method comprising:

orienting an axis of the package hat extends along a length of the package in axial alignment with the folding tip such that a portion of the axial pin is disposed within the package;

drawing air the interior circumferential surface of the folding tip and thereby applying vacuum pressure to the distal end of the package such that the distal end of the package is drawn toward the interior circumferential surface of folding tip;

while applying the vacuum pressure, causing the package and the folding tip to move relative to one another along the axis and thereby forcing the folding tip and the package together to fold a distal rim of the distal end of the package into the interior cavity, and prior to causing the package and the folding tip to move relative to one another along the axis and thereby forcing the folding tip and the package together to fold a distal rim of the distal end of the package into the interior cavity, applying positive air pressure to the interior of the package through the axial pin.

4. The method of claim 3 wherein the positive air pressure is expelled from the axial pin out a side of the axial pin.

5. The method of claim 3 wherein the positive air pressure is never expelled out of a bottom of the axial pin when the axial pin is within the package.

6. A method of using a folding tip having an axial pin that extends beyond an interior circumferential surface having a plurality of vacuum holes oriented between the axial pin and a contact surface of the folding tip to form a folded package having an interior cavity at least partially defined by a circumferential distal end, the method comprising:

orienting an axis of the package that extends along a length of the package in axial alignment with the folding tip and thereafter applying mechanical pressure to the exterior of the distal end of the package so as to compress the distal end of the package toward against the axial pin;

releasing the mechanical pressure and thereafter drawing air through the interior circumferential surface of the folding tip and thereby applying vacuum pressure to the distal end of the package such that the distal end of the package is drawn toward the interior circumferential surface of folding tip;

while applying the vacuum pressure, causing the package and the folding tip to move relative to one another along the axis and thereby forcing the folding tip and the package together to fold a distal rim of the distal end of the package into the interior cavity.

7. The method of claim 6 further comprising:

applying the vacuum pressure circumferentially to the distal end of the package.

8. The method of claim 6 further comprising:

after orienting the package in axial alignment with the folding tip, applying mechanical pressure to the exterior of the distal end of the package so as to compress the distal end of the package toward against the axial pin;

releasing the mechanical pressure and then applying the vacuum pressure to the distal end.

9. The method of claim 6 further comprising:

applying positive air pressure to the interior of the package as the package and folding tip move relative to one another along the axis thereby forcing the folding tip and the package together.

10. The method of claim 6 further comprising:

prior to causing the package and the folding tip to move relative to one another along the axis and thereby forcing the folding tip and the package together to fold a distal rim of the distal end of the package into the interior cavity, applying positive air pressure to the interior of the package through the axial pin.

11. The method of claim 10 wherein the positive air pressure is expelled from the axial pin out a side of the axial pin.

12. The method of claim 10 wherein the positive air pressure is never expelled out of a bottom of the axial pin when the axial pin is within the package.

* * * * *